United States Patent
Vodrahalli et al.

(10) Patent No.: US 12,430,274 B2
(45) Date of Patent: Sep. 30, 2025

(54) PROCESSING CORE INCLUDING INTEGRATED HIGH CAPACITY HIGH BANDWIDTH STORAGE MEMORY

(71) Applicant: Sandisk Technologies, Inc., Milpitas, CA (US)

(72) Inventors: Nagesh Vodrahalli, Los Altos, CA (US); Rama Shukla, Saratoga, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/519,210

(22) Filed: Nov. 27, 2023

(65) Prior Publication Data

US 2025/0173297 A1    May 29, 2025

(51) Int. Cl.
*G06F 13/40* (2006.01)
*G06F 13/16* (2006.01)

(52) U.S. Cl.
CPC ...... *G06F 13/4068* (2013.01); *G06F 13/1663* (2013.01); *G06F 13/1689* (2013.01)

(58) Field of Classification Search
None
See application file for complete search history.

(56) References Cited

U.S. PATENT DOCUMENTS

| | | | |
|---|---|---|---|
| 6,085,307 A * | 7/2000 | Evoy | G06F 9/3879 712/30 |
| 2015/0249096 A1 * | 9/2015 | Lupino | H01L 27/11898 257/203 |
| 2019/0326288 A1 * | 10/2019 | Hashemi | H10D 62/116 |
| 2023/0297237 A1 * | 9/2023 | Lazovsky | G02B 6/4246 |

* cited by examiner

*Primary Examiner* — Michael Sun
(74) *Attorney, Agent, or Firm* — Pearl Cohen Zedek Latzer Baratz LLP

(57) ABSTRACT

A processing core includes a multi-core processor integrated directly onto a high bandwidth, high-capacity non-volatile memory. The processor may for example be a large graphics processing unit (GPU) or artificial intelligence (AI) processor. The non-volatile memory may comprise a CBA (CMOS bonded to array) memory tile having a single large NAND memory tile coupled together with a CMOS logic circuit tile. The integrated processor and CBA memory tile may be affixed to an interposer. The processing core may further include stacks of high bandwidth memory (HBM) semiconductor dies affixed to the interposer around one or more sides of the processor and CBA memory tile.

19 Claims, 12 Drawing Sheets

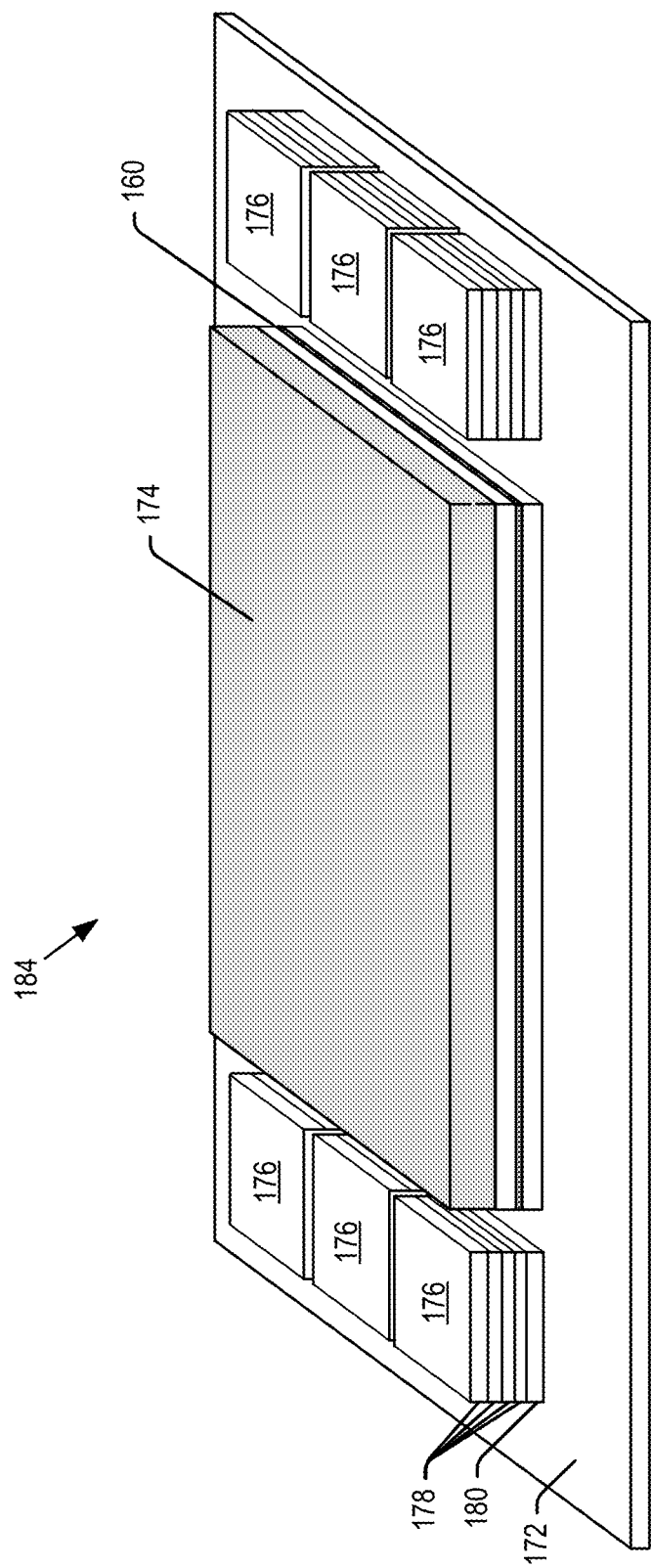

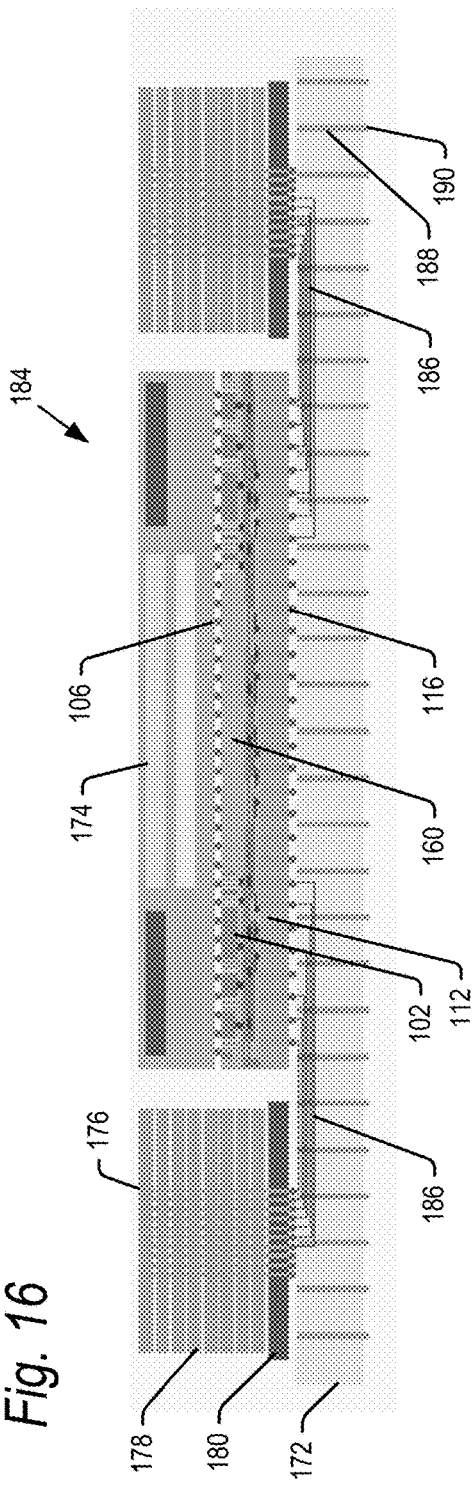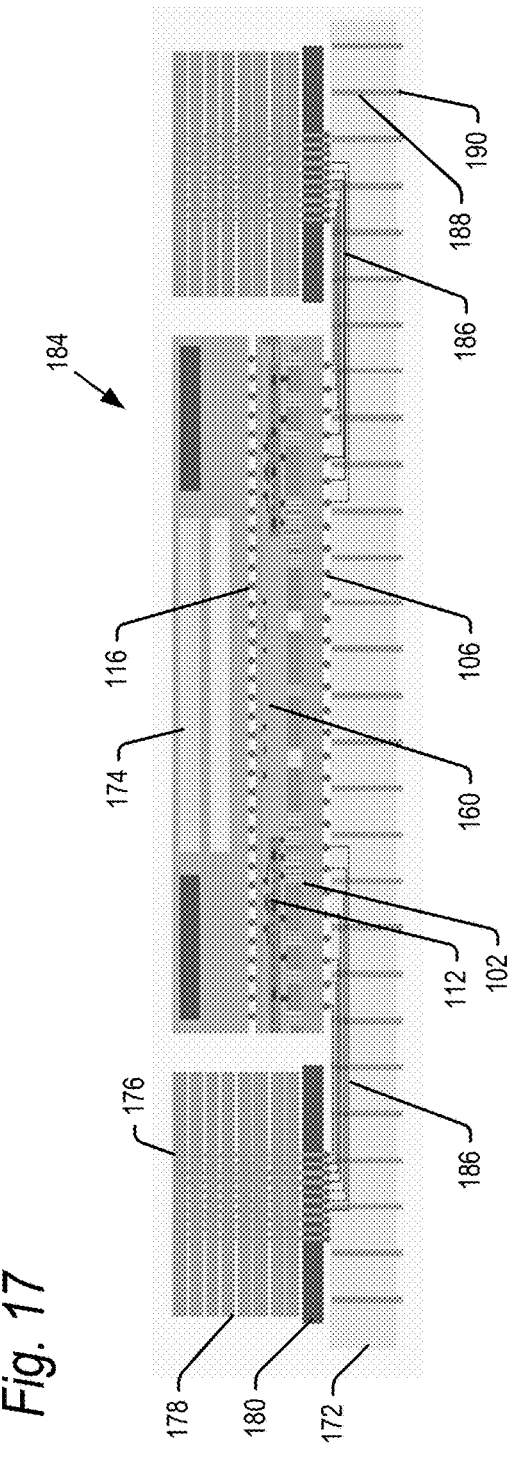

PROCESSING CORE INCLUDING INTEGRATED HIGH CAPACITY HIGH BANDWIDTH STORAGE MEMORY

BACKGROUND

Processing cores are used for performing calculations, executing instructions and managing components and peripherals to drive the operation of computers and other electronic devices. Typical processing cores include a processor such as a central processing unit that uses non-volatile and/or volatile memory to function. Non-volatile memories may for example comprise stacks of NAND semiconductor dies mounted on a substrate next to the processor or far away from the processor as may be. These semiconductor dies offer large memory capacities, but due in part to their being spaced away from the processor on the circuit board, offer relatively low bandwidth rates, high power requirements and unwanted parasitics. Volatile memories may for example comprise stacks of DRAM semiconductor dies that are specially designed to offer higher bandwidth and smaller power requirements, but at a cost of lower memory capacities in comparison to NAND dies. Traditional processing cores optimize the balance between speed and memory capacity. Typically, DRAM serves as the primary working memory, offering quick access to frequently used data. NAND memory is used for secondary storage, providing ample capacity for long-term data storage but at a slower access speed.

Recently, sophisticated processing cores have been developed including high-speed graphics processing units (GPUs) and/or artificial intelligence (AI) processing devices. GPUs are specialized processors designed to accelerate the rendering and manipulation of images, videos, and complex graphical computations, in part using a multitude of processors operating in parallel. This allows the GPUs to process a large volume of data simultaneously. AI processors are optimized for executing artificial neural networks, again using parallel processing that allows them to process a large volume of data simultaneously.

Specialized processing cores such as GPUs and AI processors have large memory capacity requirements that are not adequately serviced by conventional volatile memories. However, these devices also have high bandwidth and low power requirements that are not adequately serviced by conventional non-volatile memories.

DESCRIPTION OF THE DRAWINGS

FIG. 15 is a perspective view of a completed processing core including a processor, a CBA memory tile and HBM stacks mounted on an interposer according to embodiments of the present technology.

FIG. 16 is a cross-sectional edge view of a completed processing core including a processor, a CBA memory tile and HBM stacks mounted on an interposer according to embodiments of the present technology.

FIG. 17 is a cross-sectional edge view of a completed processing core including a processor, a CBA memory tile and HBM stacks mounted on an interposer according to a first alternative embodiment of the present technology.

DETAILED DESCRIPTION

Figure 1:
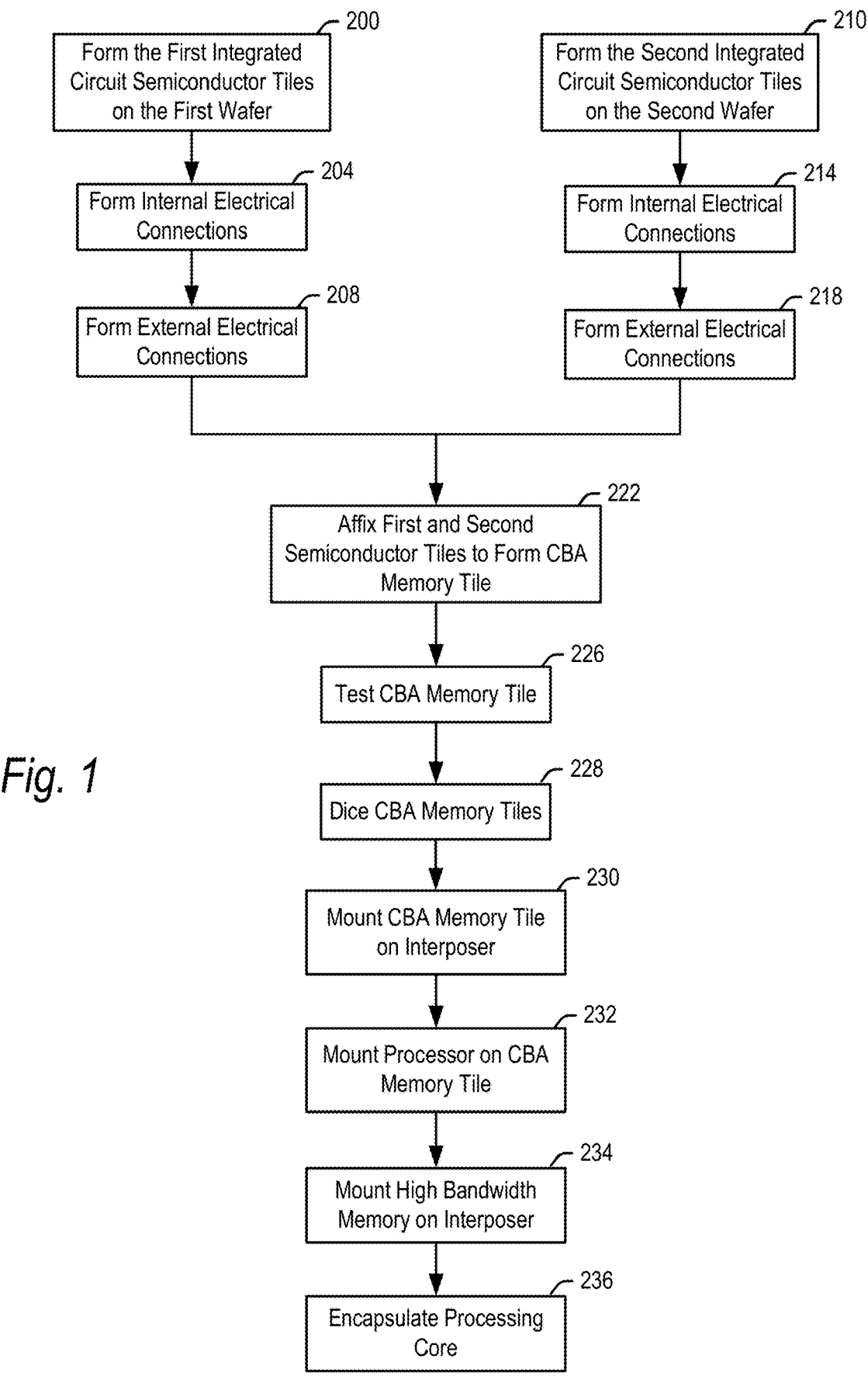
FIG. 1 is a flowchart for forming a processing core according to embodiments of the present technology.

The present technology will now be described with reference to the figures, which in embodiments, relate to a processing core including a processor integrated directly onto a high bandwidth high capacity non-volatile memory. The processor may for example be a large graphics processing unit (GPU) or artificial intelligence (AI) processor. The non-volatile memory may comprise a CBA (CMOS bonded to array) memory tile having a single large NAND memory tile coupled together with a CMOS logic circuit tile. The integrated processor and CBA memory tile may be affixed to an interposer. The processing core may further include stacks of high bandwidth memory (HBM) semiconductor dies affixed to the interposer around one or more sides of the processor and CBA memory tile.

Integrating the processor directly atop a large surface area CBA memory tile allows high bandwidth data transfer directly between the processor and CBA memory tile as well as reduced power requirements and parasitics. Moreover, the CBA memory tile may be provided with vertical pass-through zones which include no memory elements or CMOS logic circuits. These passthrough zones may include fine-pitch through silicon vias (TSVs) extending vertically through the CBA memory tile that allow data transfer between the processor and the high bandwidth memory directly through the CBA memory tile.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal," and forms thereof, as may be used herein are by way of example and illustrative purposes only, and are not meant to limit the description of the technology inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.15 mm, or alternatively, ±2.5% of a given dimension.

For purposes of this disclosure, a physical or electrical connection may be a direct connection or an indirect connection (e.g., via one or more other parts). In some cases, when a first element is referred to as being connected, affixed, mounted or coupled to a second element (either physically or electrically), the first and second elements may be directly connected, affixed, mounted or coupled to each other or indirectly connected, affixed, mounted or coupled to each other (either physically or electrically). When a first element is referred to as being directly connected, affixed, mounted or coupled to a second element, then there are no intervening elements between the first and second elements (other than possibly an adhesive or melted metal used to connect, affix, mount or couple the first and second elements).

Figure 2:
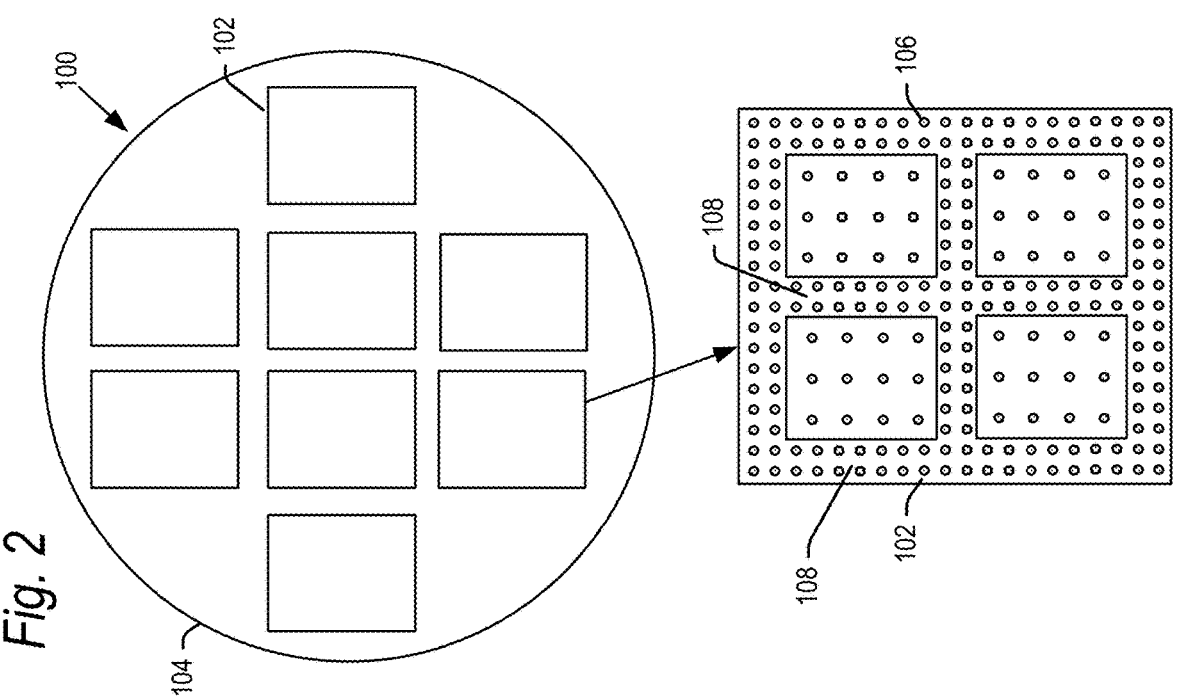
FIG. 2 is a top view of a first semiconductor wafer, and a first semiconductor tile therefrom, according to embodiments of the present technology.

An embodiment of the present technology will now be explained with reference to the flowchart of FIG. 1, and the views of FIGS. 2-20. In step 200, a first semiconductor wafer 100 may be processed into a number of first semiconductor tiles 102 as shown in FIG. 2. The first semiconductor wafer 100 may start as an ingot of wafer material which may be monocrystalline silicon grown according to either a Czochralski (CZ) or floating zone (FZ) process. However, first wafer 100 may be formed of other materials and by other processes in further embodiments.

The semiconductor wafer 100 may be cut from the ingot and polished on both the first major planar surface 104, and second major planar surface 105 (FIG. 4) opposite surface 104, to provide smooth surfaces. The first major surface 104 may undergo various processing steps to divide the wafer 100 into the respective first semiconductor tiles 102, and to form integrated circuits of the respective first semiconductor tiles 102 on and/or in the first major surface 104. FIG. 2 further shows detail of a single semiconductor tile 102 including a pattern of micro-bump pads 106 and passthrough zones 108 as explained below.

Figure 4:
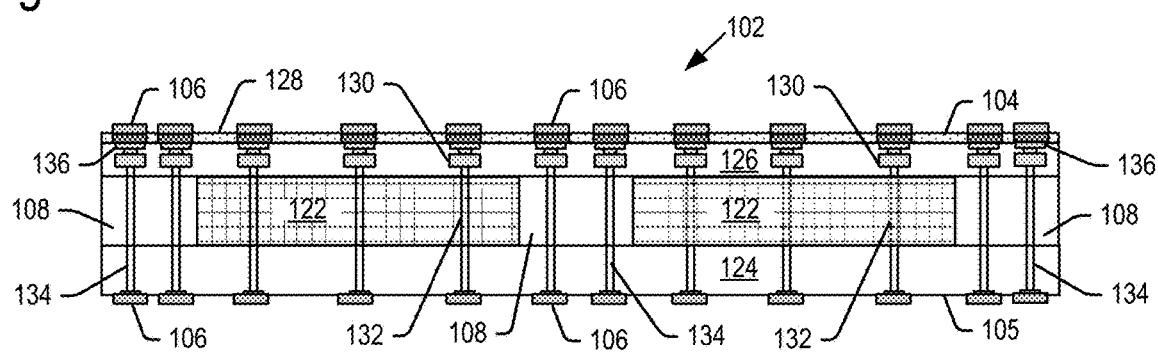
FIG. 4 is a cross-sectional edge view of a first semiconductor tile according to embodiments of the present technology.

The processing of wafer 100 in step 200 may include the formation of integrated circuit memory cell array 122 formed in a dielectric substrate including layers 124 and 126 as shown in the cross-sectional edge view of FIG. 4. A reticle may be used to transfer an integrated circuit pattern for a single semiconductor tile 102 in a photolithography process. The patterned wafer can then undergo various processes such as etching, ion implantation, and deposition to create the actual semiconductor components and interconnections needed to build the integrated circuits of a semiconductor tile 102. In embodiments, the integrated circuits may be a memory cell array 122 formed as a 3D stacked memory structure having strings of memory cells formed into layers. However, it is understood that the first semiconductor tile 102 may be processed to include integrated circuits other than a 3D stacked memory structure. A passivation layer 128 may be formed on top of the upper dielectric film layer 126.

Semiconductor processing is trending toward smaller and smaller semiconductor dies. In conventional semiconductor processing, a single reticle may include the pattern for multiple semiconductor dies, and the reticle may be used to define hundreds, if not thousands, of semiconductor dies on a single wafer. The present technology goes counter to this trend. The semiconductor tiles 102 may be the size of an entire reticle, and the reticle is used to form a relatively small number of semiconductor tiles on the wafer 100. As explained below, the size of a semiconductor tile 102 may for example be 32 mm by 25 mm. However, it is understood that the size of a semiconductor tile 102 may vary in further embodiments, and a single reticle may have the pattern for more than one semiconductor tile 102 in further embodiments.

After formation of the memory cell array 122, internal electrical connections may be formed within the first semiconductor tile 102 in step 204. The internal electrical connections may include multiple layers of metal interconnects 130 and vias 132 formed sequentially through layers of the dielectric film 126. As is known in the art, the metal interconnects 130, vias 132 and dielectric film layers 126 may be formed for example by damascene processes a layer at a time using photolithographic and thin-film deposition processes. The photolithographic processes may include for example pattern definition, plasma, chemical or dry etching and polishing. The thin-film deposition processes may include for example sputtering and/or chemical vapor deposition. The metal interconnects 130 may be formed of a variety of electrically conductive metals including for example copper and copper alloys as is known in the art, and the vias 132 may be lined and/or filled with a variety of electrically conductive metals including for example tungsten, copper and copper alloys as is known in the art.

As seen for example in FIG. 4, the metal interconnects 130 and vias 132 may be formed to and through the memory cell array 122 to carry signals to and from the memory cell array 122. However, as noted, semiconductor tile 102 may include certain areas, referred to herein as passthrough zones 108, which are devoid of memory cells or other integrated circuits. These areas 108 include TSVs 134. The TSVs 134 may include metal interconnects and vias and may be formed in the same manner as metal interconnects 130 and vias 132 described above. In FIGS. 2 and 4, the TSVs 134 and bump pads 106 are more densely packed within the passthrough zones 108, as compared to the interconnects 130, vias 132 and bump pads 106 outside of the zones 108. However, as explained below, the density of the TSVs 134 and bump pads inside the passthrough zones 108 may be the same or less than the density of interconnects 130, vias 132 and bump pads 106 outside of the zones 108.

In step 208, micro-bump pads 106 may be formed on the major planar surfaces 104 and 105 of the first semiconductor tiles 102. As shown in FIGS. 2 and 4, these bump pads may be formed on top of and/or on the bottom of vias 132 and TSVs 134. As is also explained below, the bump pads 106 are provided for transferring signals to and from the semiconductor tile 102. The bump pads may be etched into the passivation layer 128, and each bump pad 106 may be formed over a liner 136. As is known in the art, the bump pads 106 may be formed for example of copper, aluminum and alloys thereof, and the liner 136 may be formed for example of a titanium/titanium nitride stack such as for example Ti/TiN/Ti, though these materials may vary in further embodiments. The bump pads 106 and liner 136 may be applied by vapor deposition and/or plating techniques. The integrated circuit memory arrays 122 may be electrically connected to the bump pads 106 by the metal interconnects 130 and vias 132.

FIG. 2 shows semiconductor tiles 102 on wafer 100, and bump pads 106 in a pattern on one of the semiconductor tiles 102. The number of first semiconductor tiles 102 shown on wafer 100 in FIG. 2 is for illustrative purposes, and wafer 100 may include more or less first semiconductor tiles 102 than are shown in further embodiments. Similarly, the pattern of bump pads 106, as well as the number of bump pads 106, on the first semiconductor tile 102 are shown for illustrative purposes. Each first tile 102 may include more bump pads 106 than are shown in further embodiments, and may include various other patterns and densities of bump pads 106.

Figure 3:
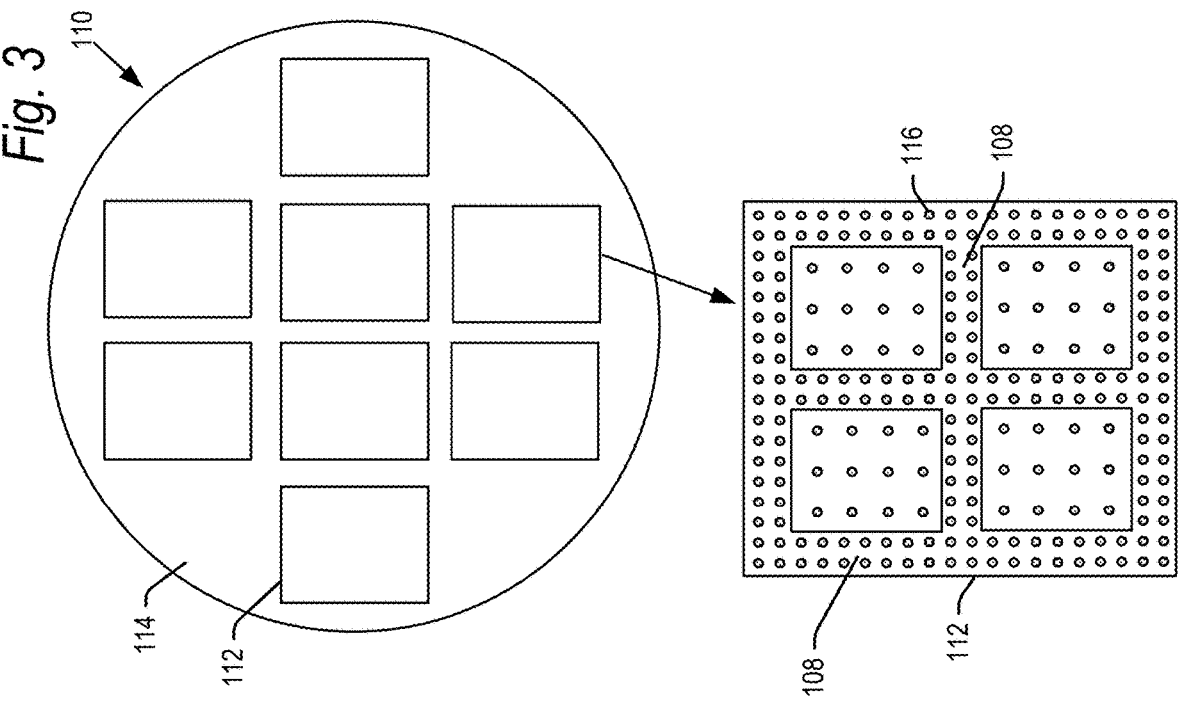
FIG. 3 is a top view of a second semiconductor wafer, and a second semiconductor tile therefrom, according to embodiments of the present technology.

Before, after or in parallel with the formation of the first semiconductor tiles on wafer 100, a second semiconductor wafer 110 may be processed into a number of second semiconductor tiles 112 in step 210 as shown in FIG. 3. The semiconductor wafer 110 may start as an ingot of monocrystalline silicon grown according to either a CZ, FZ or other process. The second semiconductor wafer 110 may be cut and polished on both the first major surface 114, and second major surface 115 (FIG. 5) opposite surface 114, to provide smooth surfaces. The first major surface 114 may undergo various processing steps to divide the second wafer 110 into the respective second semiconductor tiles 112, and to form integrated circuits of the respective second semiconductor tiles 112 on and/or in the first major surface 114. FIG. 3 further shows detail of a single semiconductor tile 112 including a pattern of micro-bump pads 116 and passthrough zones 108 as explained below.

Figure 5:
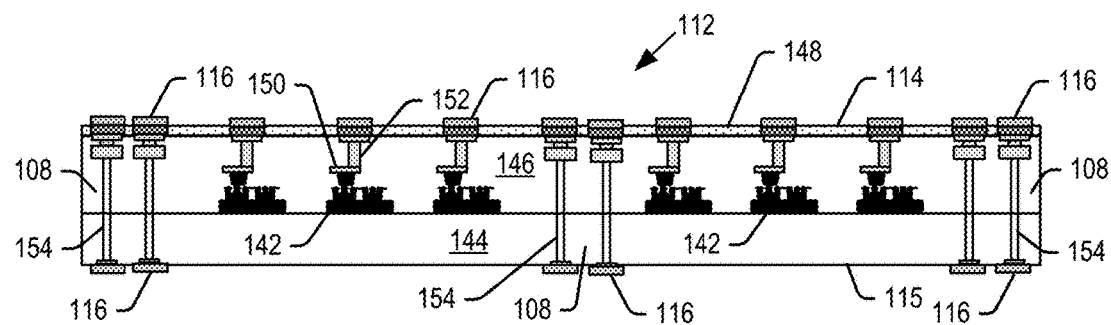
FIG. 5 is a cross-sectional edge view of a second semiconductor tile according to embodiments of the present technology.
Figure 6:
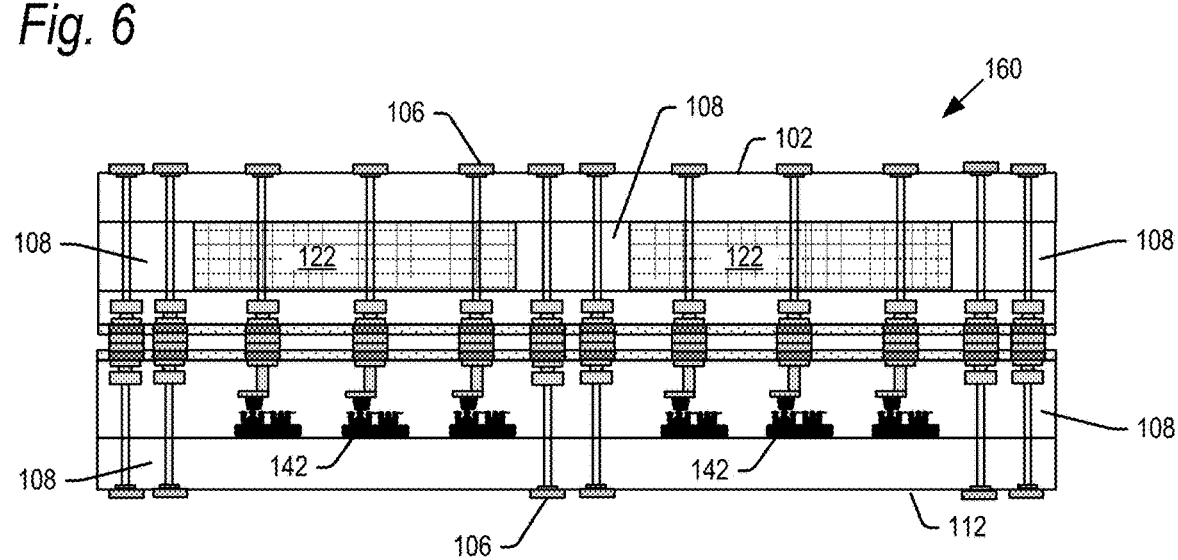
FIG. 6 is a cross-sectional edge view of a CBA memory tile including a first semiconductor tile bonded to a second semiconductor tile according to embodiments of the present technology.

In one embodiment, the second semiconductor tiles 112 may be processed to include integrated circuits 142 formed in a dielectric substrate including layers 144 and 146 as shown in the cross-sectional edge view of FIG. 5. Integrated circuits 142 may be configured as logic circuits to control read/write operations for one or more integrated memory cell arrays 122. The logic circuits may be fabricated using CMOS technology, though the logic circuits may be fabricated using other technologies in further embodiments. The second semiconductor tiles 112 may include other and/or additional integrated circuits in further embodiments as explained below. A passivation layer 148 may be formed on top of the upper dielectric film layer 136.

After formation of the CMOS logic circuits 142, internal electrical connections may be formed within the second semiconductor tile 112 in step 204. The internal electrical connections may include multiple layers of metal interconnects 150 and vias 152 formed sequentially through layers of the dielectric film 146. The metal interconnects 150, vias 152 and dielectric film layers 146 may be formed in the same manner as interconnects 130, vias 132 and dielectric film layer 126 described above for tiles 102.

As seen for example in FIG. 4, the metal interconnects 150 and vias 152 may be connected to the CMOS logic circuits 142 to carry signals to and from the logic circuits 142. However, as noted, semiconductor tile 112 may include passthrough zones 108, which are devoid of the CMOS logic or other integrated circuits. The size and pattern of passthrough zones 108 in semiconductor tiles 112 may match the size and pattern of passthrough zones 108 in semiconductor tiles 102. The passthrough zones 108 in tile 112 may include TSVs 154. The number and pattern of TSVs 154 may match the number and pattern of TSVs 134 described above.

In step 208, micro-bump pads 116 may be formed on the major planar surfaces 114 and 115 of the second semiconductor tiles 122. As shown in FIGS. 3 and 5, these bump pads may be on top of and/or below vias 152 and TSVs 154. As is also explained below, the bump pads 116 are provided for transferring signals to and from the semiconductor tile 112. The bump pads may be etched into the passivation layer 148, and may include liners 156. Bump pads 116 and liners 156 may be formed in the same manner as bump pads 106 and liners 146 described above. The CMOS logic circuits 142 may be electrically connected to the bump pads 116 by the metal interconnects 150 and vias 152.

FIG. 3 shows semiconductor tiles 112 on wafer 110, and bump pads 116 in a pattern on one of the semiconductor tiles 112. The number of second semiconductor tiles 112 shown on wafer 110 in FIG. 3 is for illustrative purposes, and wafer 110 may include more or less second semiconductor tiles 112 than are shown in further embodiments. Similarly, the pattern of bump pads 116, as well as the number of bump pads 116, on the second semiconductor tile 112 are shown for illustrative purposes. Each second tile 112 may include more bump pads 116 than are shown in further embodiments, and may include various other patterns and densities of bump pads 116.

Once the fabrication of first and second semiconductor tiles 102 and 112 is complete, the first and second semiconductor wafers 110 and 110 may be affixed to each other in step 222 so that the respective memory tiles 102 are bonded to the CMOS logic circuit tiles 112. Each pair of bonded tiles 102, 112 are referred to herein as a CMOS bonded to array (CBA) memory tile 160. An example of the completed CBA memory tile 160 is shown for example in the cross-sectional edge view of FIG. 6. To bond the tiles 102, 112, the first semiconductor wafer 100 may be flipped over (relative to the view of FIG. 4), and bump pads 106 and 116 of the respective tiles 102 and 112 may be physically and electrically coupled to each other. As shown and noted, the number and pattern of bump pads 106 may match the number and pattern of bump pads 116 so that the pads align with each other when the tiles 102, 112 are coupled together. In embodiments where the number and pattern of bump pads 106, 116 are not symmetrical about a central vertical axis through the tiles, the number and pattern of bump pads 106 may be the mirror image of the number and pattern of bump pads 116 so that the pads 106, 116 align when tile 102 is flipped over.

The first and second semiconductor tiles 102, 112 in the CBA memory tile 160 may be bonded to each other by initially aligning the bump pads 106 and 116 on the respective tiles 102, 112 with each other. Thereafter, the bump pads 106, 116 may be bonded together by any of a variety of bonding techniques, depending in part on bump pad size and bump pad spacing (i.e., bump pad pitch). The bump pad size and pitch may in turn be dictated by the number of electrical interconnections required for the CBA memory tile 160 as explained below.

Figure 7:
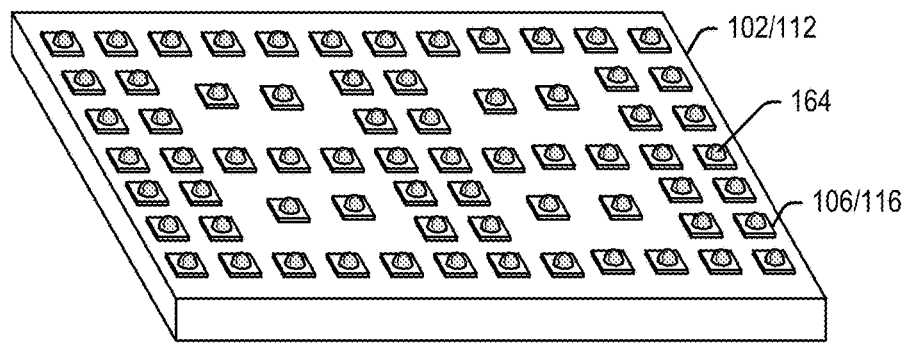
FIGS. 7-9 are perspective views showing various bump pad patterns on one of the first and second semiconductor tile according to embodiments of the present technology.

In one embodiment shown in FIG. 7, one or both sets of bump pads 106, 116 on the mating surfaces of the first and second tiles 102, 112 may include micro-bumps 164 applied to the surfaces of pads 106 and/or 116. A small, controlled amount of solder, copper, bronze, gold or other metal may be applied to bump pad 106 and/or to bump pad 116 of a pair of bump pads to be joined. The respective bump pads may be coupled to each other by micro-bumps 164 using for example thermo-compression. In example, the bump pads 106, 116 may be about 50 µm square. Again, the number and pattern of bump pads 106/116 shown in FIG. 7 is for illustrative purposes only and may vary in further embodiments.

Figure 8:
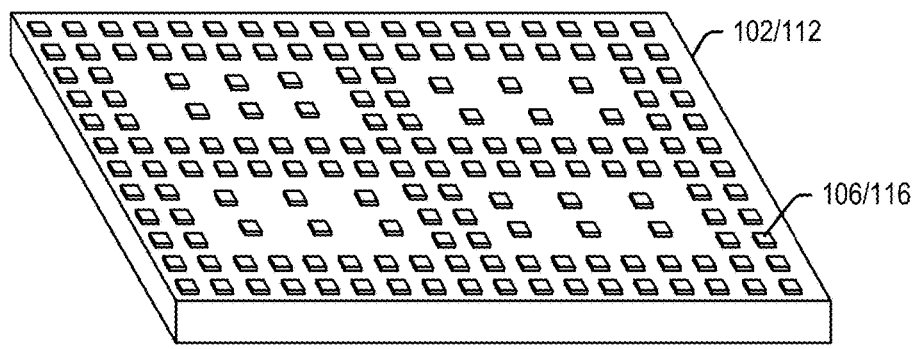

Instead of using micro-bumps 164, the pads 106 and 116 of tiles 102 and 112 may be bonded to each other without solder or other added material, in a so-called Cu-to-Cu bonding process. Such an example is shown in FIG. 8. In a Cu-to-Cu bonding process, the bump pads 106, 116 are controlled to be highly planar and formed in a highly controlled environment largely devoid of ambient particulates. Under such properly controlled conditions, the bump pads 106, 116 are aligned and pressed against each other to form a mutual bond based on surface tension. Such bonds may be formed at room temperature, though heat may also be applied. In embodiments using Cu-to-Cu bonding, the bump pads 106, 116 may be about 5 µm square, and the bumps 106, 116 may be spaced from each other with a pitch of 10 µm to 20 µm. The pads and/or pitch may be larger or smaller than that in further embodiments. While this process is referred to herein as Cu-to-Cu bonding, this term may also apply even where the bump pads 106, 116 are formed of materials other than copper.

Figure 9:
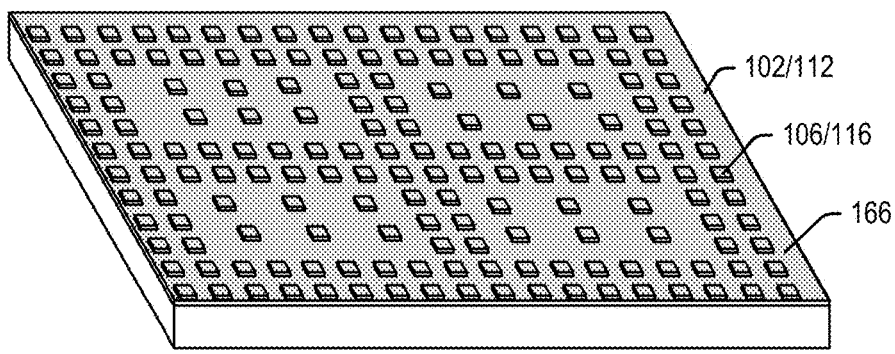

In a further embodiment shown in FIG. 9, the Cu-to-Cu bond may be enhanced by providing a film layer 166 on the surface 104 of the first tiles 102, and a film layer 166 on the surface 114 of the second tiles 112. Such a film layer 166 is provided around the bump pads 106, 116. When the first and second tiles 102, 112 are brought together, the bump pads 106, 116 may bond to each other using surface tension, and the film layers 166 on the respective tiles may bond to each other using adhesion and/or surface tension. Such a bonding technique may be referred to as hybrid bonding. In embodiments using hybrid bonding, the bump pads 106, 116 may be about 5 µm square, and the bumps 106, 116 may be spaced from each other with a pitch of 5 µm to 10 µm. The pads and/or pitch may be larger or smaller than that in further embodiments.

Figure 10:
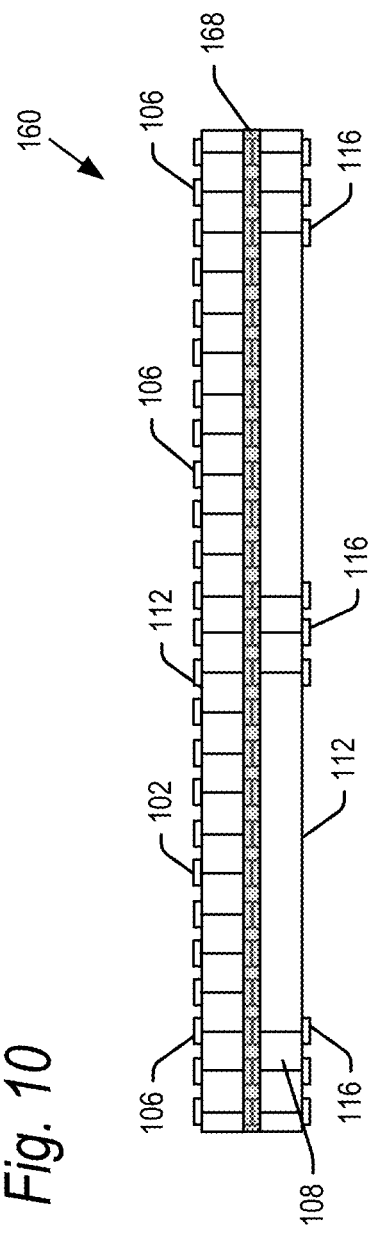
FIGS. 10 and 11 are edge and perspective views showing a CBA memory tile according to embodiments of the present technology.
Figure 11:
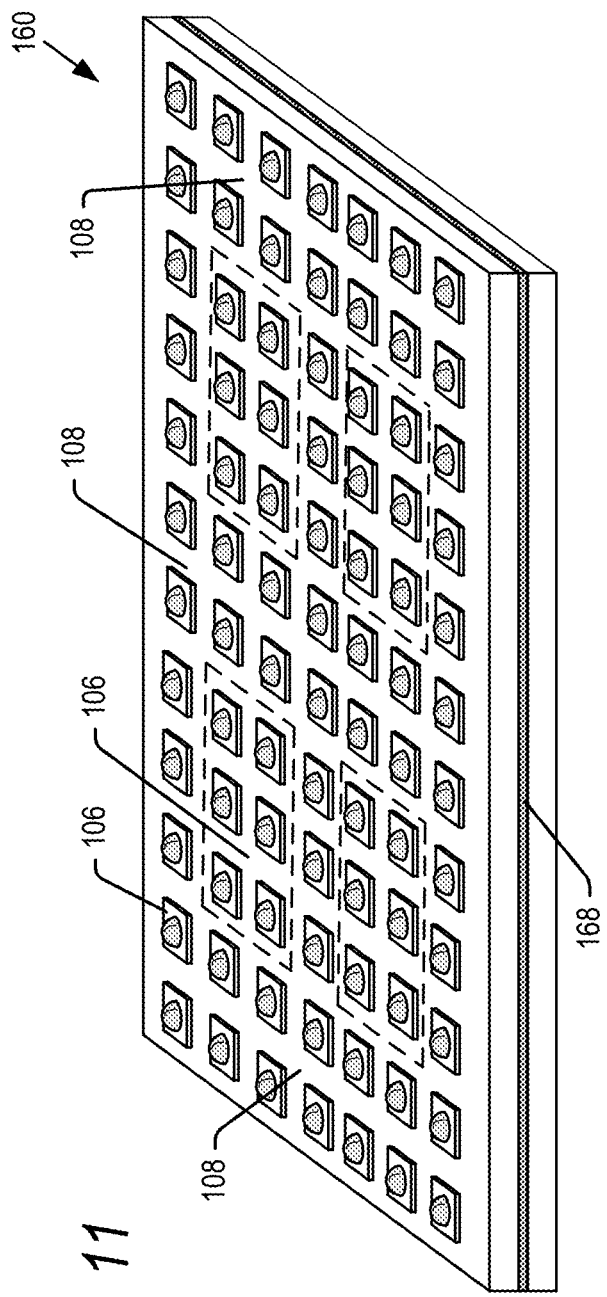

As noted, once coupled to each other in step 222, the first semiconductor tile 102 and the second semiconductor tile 112 together form a CBA memory tile 160. The tile 160 may be operationally tested in step 226 as is known, for example with read/write and burn in operations. The tiles 160 may be diced from the joined wafers 100, 110 in step 228. Examples of the CBA memory tile 160 are shown in the cross-sectional edge view of FIG. 6 described above, as well as in the edge and perspective views of FIGS. 10 and 11. As shown, once coupled together, the bump pads 106 on the surface 105 of tile 102 and the bump pads 116 on surface 115 of tile 112 may remain exposed. These exposed bump pads 106, 116 may be used as explained below. Again, the views of FIGS. 10 and 11 are merely illustrative examples. The number, pattern and/or densities of bump pads 106, 116 shown may vary in further examples.

In one embodiment described above, a film 166 (FIG. 9) may be provided on a surface of one of the first and second tiles 102, 112. Where no such film is initially provided, a space between the first and second tiles of the CBA memory tile 160 may be under filled with an epoxy or other resin or polymer 168 (FIGS. 10 and 11). The under-fill material 168 may be applied as a liquid which then is cured into a solid layer. This under-fill step protects the electrical connections between the first and second tiles 102, 112, and further secures the second tile 112 onto the first tile 102. Various materials may be used as under-fill material 168, but in embodiments, it may be Hysol epoxy resin from Henkel Corp., having offices in California, USA.

As noted above, the CBA memory tile 160 includes passthrough zones 108. These passthrough zones are now explained in greater detail with reference to FIG. 12. In the embodiment shown, the passthrough zones 108 comprise a border around the periphery of tile 160, and a cross pattern extending horizontally and vertically through a center of tile 160. It is understood that the passthrough zones may comprise other patterns on tile 160 in further embodiments. As noted, there are no memory array circuits 122 or logic circuits 142 in the passthrough zones 108.

The bump pads 106 in the passthrough zones 108 are used to transfer, or passthrough, power, ground and data signals to and from a processor (see FIG. 14), through the CBA memory tile 160. In one embodiment, as explained below, the passthrough zones 108 around the periphery of tile 160 may be used for signal exchange between the processor and high bandwidth memory also mounted on the interposer, through the tile 160. Given the large numbers of these connections, these periphery passthrough zones 108 may have a width, w, of about 1.25 mm, with 25 rows of bump pads across the width having a pitch of about 40 µm. The pitch of the bump pads along the length, l, may be about 60 µm. In this embodiment, the cross pattern of passthrough zones 108 through the center of the tile 160 may be used for power and ground signals. These cross pattern passthrough zones 108 may have a width, w, of about 500 µm, with 10 rows of bump pads across the width having a pitch of about 50 µm. The pitch of the bump pads along the length, l, may be about 125 µm. Each of these dimensions is by way of example and may vary, proportionately and disproportionately to each other, in further embodiments. It is further understood that the portions of the passthrough zones used for signals, power and ground may also vary in further embodiments.

It is understood that the size of the passthrough zones may be increased or decreased based on the requirements of the processing core. Where more passthrough connections are needed, the size of the passthrough zones may be increased and the number of direct connections between the tile 160 and processor may be decreased. Where less passthrough connections are needed (or more direct connections between the core 160 and processor are needed), the size of the passthrough zones may be decreased and the number of direct connections between the tile 160 and processor may be increased.

The areas 170 are the areas of tile 160 including the memory array circuits 122 and logic circuits 142, and are positioned outside of passthrough zones 108. In the embodiment shown, the passthrough zones divide the areas 170 into four quadrants. Again, this is one of many possible configurations of the areas 170 including the memory array circuits 122 and logic circuits 142.

As explained below, the CBA memory tile 160 may be mounted on a signal conducting medium, such as a printed circuit board (PCB), a substrate, or an interposer, and a processor may be mounted atop the CBA memory tile 160. The terms PCB, substrate and interposer may be used interchangeably herein, and refer to a means for electrically interconnecting one or more modules or circuits to each other, such as coupling a processor and/or CBA memory tile to one or more semiconductor memory dies. Further, the use of one term over another does not impute specific characteristics to the "signal carrying medium," such as base materials, number of layers, etc. It is believed that one of skill in the art will be able to understand that where, for instance, the term interposer is used, that interposer also may refer to a substrate or a printed circuit board. The bump pads 116 in the areas 170 allow the processor to be directly coupled to CBA memory tile 160 so that the processor can perform read/write operations to the memory tile 160. Given the large size of the CBA memory tile 160, there is ample room for all of the channels and electrical connections between the processor and CBA memory tile 160. In embodiments, the spacing between, or pitch, of bump pads 106 in the areas 170 may be 2 µm to 50 µm, depending in part on the bonding technology used. Given this pitch and the large surface area of the CBA tile 160, this allows for about 200,000 direct connections between the tile 160 and the processor. The number of direct connections may be more or less than this number in further embodiments. As discussed below, this allows for high bandwidth, wide-word data direct data transfer to and from the CBA memory tile 160. There may be greater or fewer direct connections in further embodiments.

Figure 12:
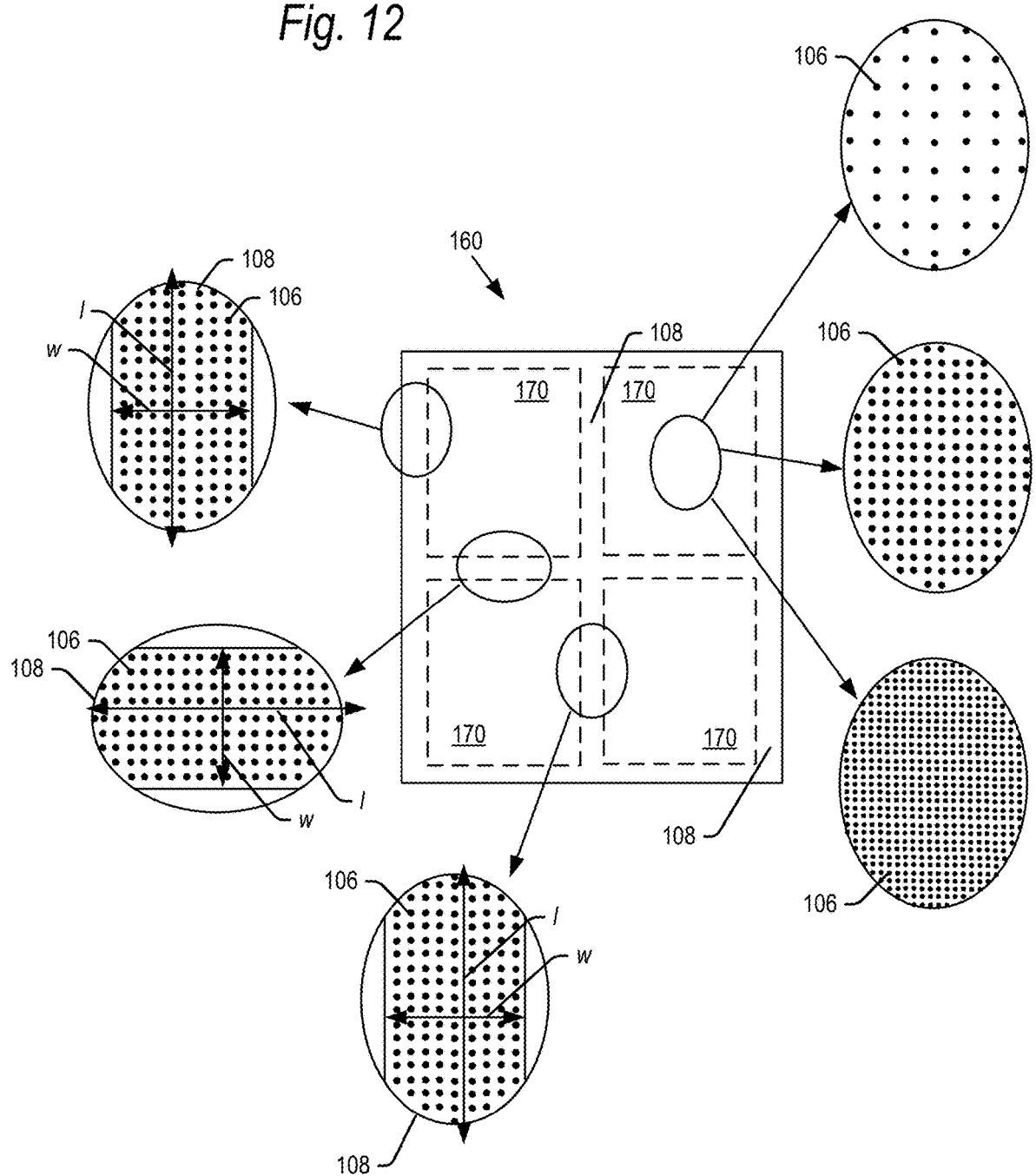
FIG. 12 is a top view of a CBA memory tile including enlarged views of portions of the tile according to embodiments of the present technology.

FIG. 12 further shows three enlarged views of alternative densities of the bond pads 106, 116 in the areas 170 to the right of CBA memory tile 160. In the top enlarged view, the density of the pads 106, 116 are less than the densities of the pads 106, 116 in the passthrough zones 108. In the middle enlarged view, the density of the pads 106, 116 are the same as the densities of the pads 106, 116 in the passthrough zones 108. In the bottom enlarged view, the density of the pads 106, 116 are greater than the densities of the pads 106, 116 in the passthrough zones 108. While three enlarged views are shown, the areas 170 would have only one of these three alternative options.

Figure 13:
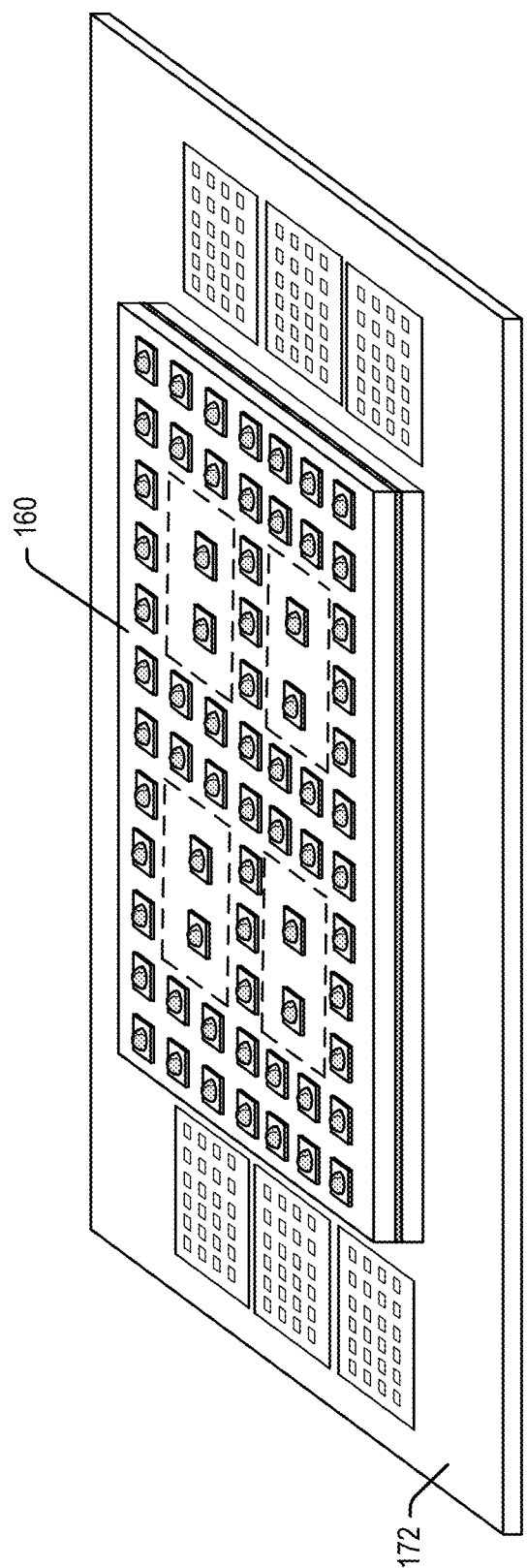
FIG. 13 is a perspective view of a CBA memory tile mounted on an interposer according to embodiments of the present technology.

In step 230, the CBA memory tile 160 may be mounted on an interposer 172 as shown in the perspective view of FIG. 13. Interposer 172 may be a signal-carrying medium including multiple conductive layers formed into conductance patterns interspersed between dielectric layers. The interposer 172 is used to transfer signals to and from the CBA memory tile 160 and the processor mounted thereon as explained below. Other signal-carrying mediums may be used in further embodiments, including a flexible tape, a substrate or a printed circuit board.

A top surface of the interposer 172 may have a pattern of contact pads (not shown) matching in number and arrangement to the bump pads 116 on a bottom surface 115 of the CBA memory tile 160. The CBA memory tile 160 may be physically and electrically coupled to the interposer 172 by mating the bump pads 116 on the surface 115 of tile 160 with the contact pads on the upper surface of interposer 172. The bond between the bump pads 116 and contact pads of the interposer may be accomplished using any of the methods described above for bonding bump pads 116 and bond pads 106 within the tile 160.

Figure 14:
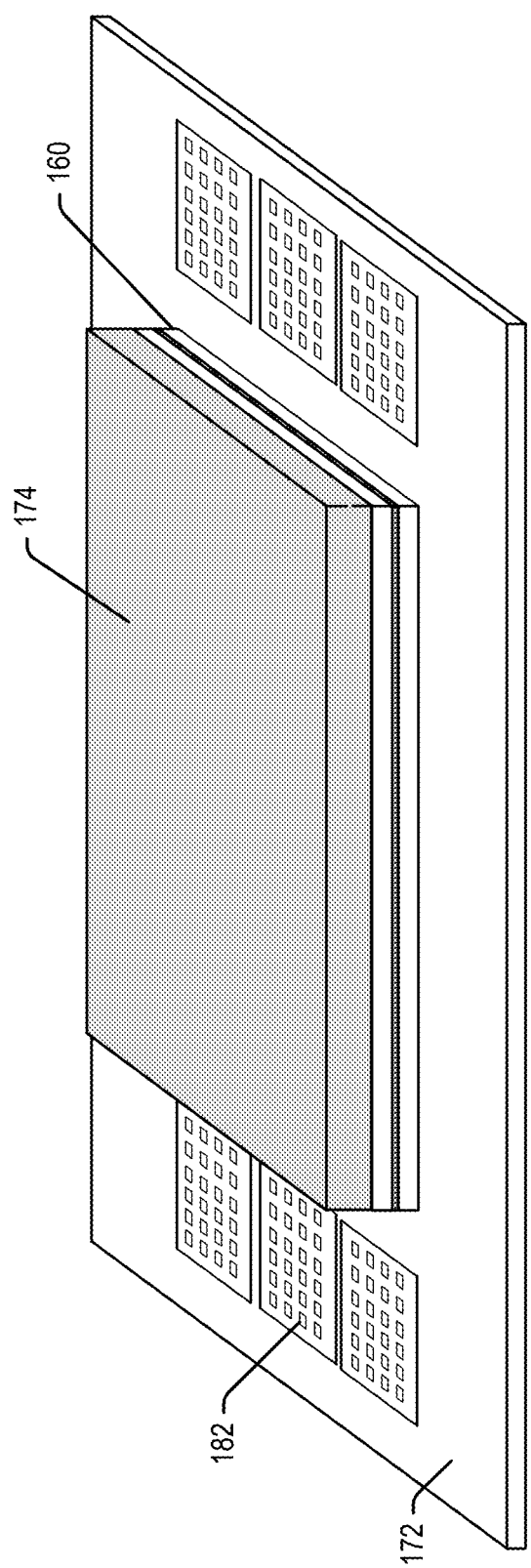
FIG. 14 is a perspective view of an integrated processing core including a processor and a CBA memory tile mounted on an interposer according to embodiments of the present technology.

In step 232, a processor 174 may be mounted on top of the CBA memory tile 160, as shown in the perspective view of FIG. 14, to form an integrated processor/memory core. In embodiments, processor 174 may be a specialized processor such as a graphics processing unit (GPU) or an artificial intelligence (AI) processor capable of parallel processing, sophisticated graphics rendering and/or other high bandwidth, data-intensive tasks. The processor 174 may include multiple processing cores enabling the processor 174 to perform multiple computing tasks simultaneously. In further embodiments, processor 174 may be other types of processors, such a traditional central processing unit.

In embodiments, the CBA memory tile has the same length and width (same footprint) as the processor 174. A bottom surface of the processor 174 may have a pattern of contact pads (not shown) matching in number and arrangement to the bump pads 106 on a top surface 104 of the CBA memory tile 160. The processor 174 may be physically and electrically coupled to the CBA memory tile 160 by mating the bump pads 106 of the tile with the contact pads on the bottom surface of the processor 174. The bond between the bump pads 106 and contact pads of the processor 174 may be accomplished using any of the methods described above for bonding bump pads 116 and bond pads 106 within the tile 160.

In step 234, high bandwidth memory (HBM) stacks 176 may be mounted around one or more sides of the tile 160 and processor 174, as shown in the perspective view of FIG. 15. In embodiments, each HBM stack 176 includes one or more HBM dies 178 mounted on a dedicated HBM controller 180. The number of HBM dies 178 in each stack may vary. Embodiments use HBM stacks because HBM is a type of high-speed, high-bandwidth, and low-power memory that is designed to provide fast data access to specialized, high-performance processors, such as the GPU or AI processor which may comprise the processor 174. Other types of memory may be used in stacks 176, including for example DRAM, SRAM or other types of volatile memories. The controller 180 is used to operate and communicate with the dies 178 in each HBM stack 176.

In the illustrated embodiment, there are three HBM stacks 176 on each of two opposed sides of the tile 160 and processor 174. There may be more or less stacks around more or less sides in further embodiments. Each of the dies in stack 176 may be electrically coupled to each other using TSVs, and a bottom surface of the stack 176 may have a pattern of contact pads (not shown) matching in number and arrangement to the contact pads 182 on interposer 172, one of which is numbered in FIG. 14. Each stack 176 may be physically and electrically coupled to pads 182 on interposer 172 as described above with regard to other pad couplings.

FIG. 15 shows a perspective view of a completed processing core 184 including the integrated CBA memory tile 160 and processor 174 together with HBM stacks 176 mounted on interposer 172. FIG. 16 is a cross-sectional view of processing core 184 showing internal electrical connections. The drawing for example shows the bump pads 106 between the CBA memory tile 160 and the processor 174. The drawing further shows the bump pads 116 between the CBA memory tile 160 and the interposer 172. Electrical traces 186 are further shown within layers of the interposer 172 for electrically coupling the integrated CBA memory tile 160/processor 174 to the high bandwidth memory stacks 176 (through the passthrough zones of the CBA memory tile 160). Also shown are vias 188 through the interposer 172 coupled to pads 190 on a bottom surface of the interposer 172 for electrically coupling the processing core 184 to a printed circuit board of a host device (not shown). It is noted that the tiles 102, 112, the processor 174 and high-bandwidth semiconductor dies 178 are shown in the figures for illustrative purposes only, and the thicknesses of the tiles, processor and high-bandwidth semiconductor dies are not drawn to scale in the figures.

The processing core 184 described above sets forth one example of components, but it is understood that various alternatives and or additions to processing core 184 may be made in further embodiments. For example, FIG. 17 illustrates an example where the CBA memory tile 160 is flipped over, so that the CMOS logic circuit tile 112 is on top (directly bonded to the processor 174 by pads 116) and the memory array tile 102 is on the bottom (directly bonded to the interposer 172 by pads 106). In this embodiment, the electrical connections previously described as being formed in and through memory array tile 102 may instead be formed in and through the CMOS logic circuit tile 112. Similarly, the electrical connections previously described as being formed in and through the CMOS logic circuit tile 112 may instead be formed in and through the memory array tile 102.

Figure 18:
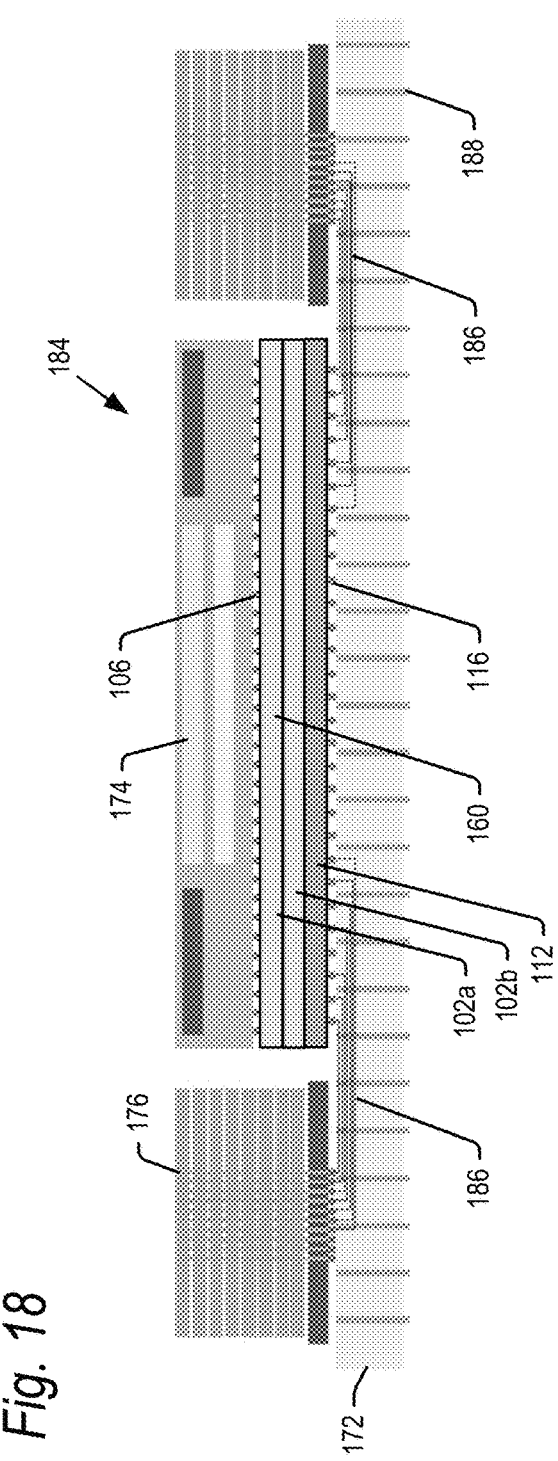
FIG. 18 is a cross-sectional edge view of a completed processing core including a processor, a CBA memory tile and HBM stacks mounted on an interposer according to a second alternative embodiment of the present technology.
Figure 19:
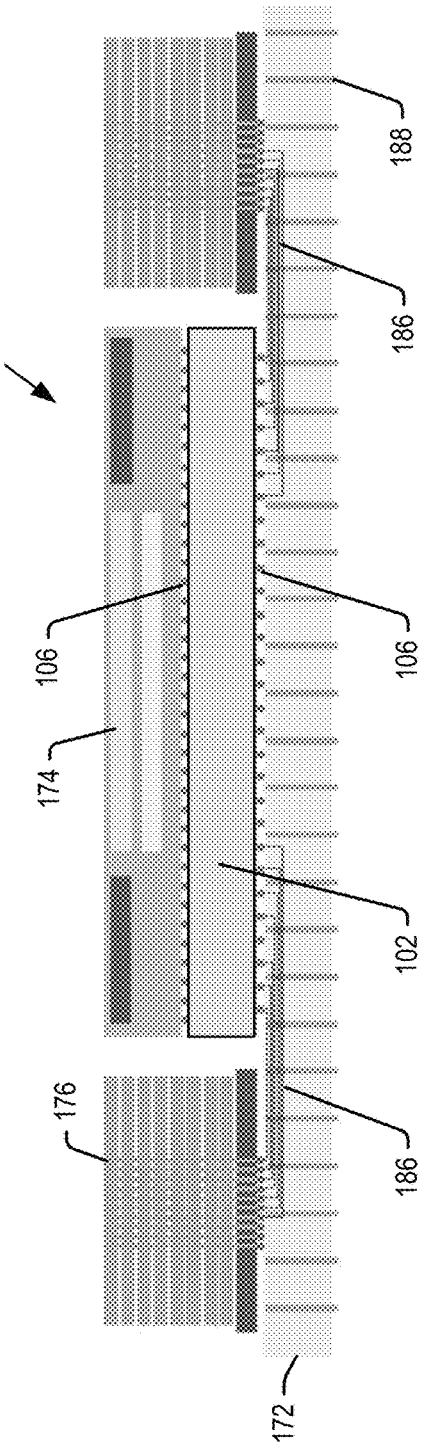
FIG. 19 is a cross-sectional edge view of a completed processing core including a processor, a CBA memory tile and HBM stacks mounted on an interposer according to a third alternative embodiment of the present technology.

In embodiments described above, the CBA memory tile 160 includes a single memory array tile 102. This embodiment provides sufficient memory storage for direct access by the processor 174. However, a further alternative of processing core 184 is shown in FIG. 18 where additional layer of non-volatile memory storage is provided. This embodiment includes a CBA memory tile 160 comprised of a pair of memory array tiles 102a, 102b bonded to each other and CMOS logic circuit tile 112. In this embodiment, the electrical connections previously described as being formed in and through memory array tile 102 may also be formed in and through the memory array tiles 102a and 102b. More than two memory array tiles may be used in further embodiments.

Provision of the CMOS logic circuit tile 112 provides a variety of advantages as described below. However, in a further embodiment shown in FIG. 19, the CMOS logic circuit tile 112 may be omitted. In this embodiment, the memory array tile 102 by itself serves as the non-volatile memory for the processor 174. This embodiment may include more than one memory array tile in further embodiments. Again, thicknesses are not drawn to scale in FIG. 19.

Figure 20:
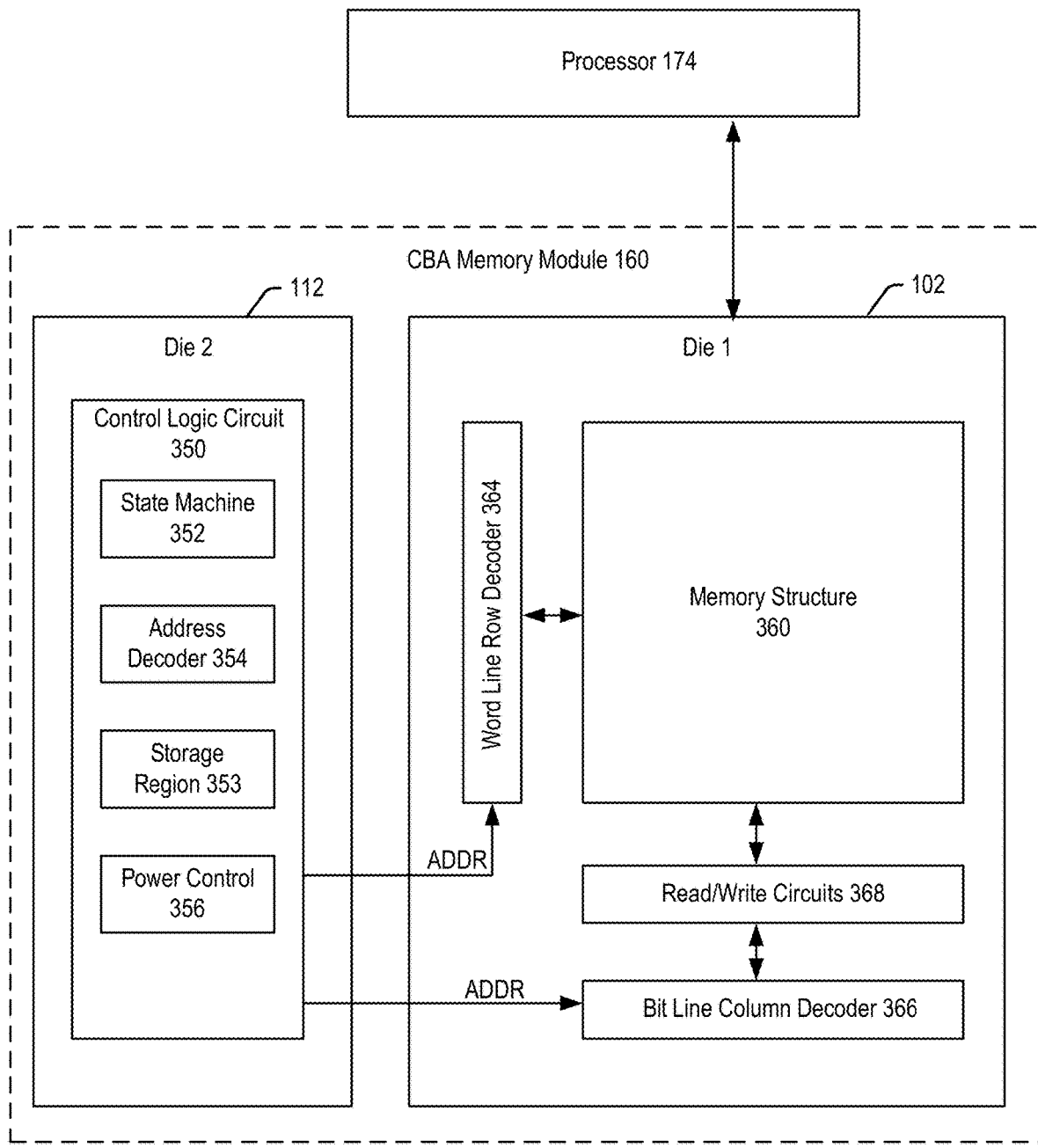
FIG. 20 is a functional block diagram of a CBA memory tile coupled to a processor according to embodiments of the present technology.

FIG. 20 is a functional block diagram showing further detail of an embodiment of the memory array tile 102 and CMOS logic circuit tile 112. The memory array tile 102 of the CBA memory tile 160 may include a memory structure 360 of memory cells, such as an array of memory cells, and read/write circuits 368. The CMOS logic circuit tile 112 may include control logic circuitry 350. The memory structure 360 is addressable by word lines via a row decoder 364 and by bit lines via a column decoder 366. The read/write circuits 368 may include multiple sense blocks (sensing circuitry) that allow a page of memory cells to be read or programmed in parallel.

Multiple memory elements in memory structure 360 may be configured so that they are connected in series or so that each element is individually accessible. By way of non-limiting example, flash memory systems in a NAND configuration (NAND memory) typically contain memory elements connected in series. A NAND string is an example of a set of series-connected transistors comprising memory cells and select gate transistors.

A NAND memory array may be configured so that the array is composed of multiple strings of memory in which a string is composed of multiple memory elements sharing a single bit line and accessed as a group. Alternatively, memory elements of memory structure 160 may be configured so that each element is individually accessible, e.g., a NOR memory array. NAND and NOR memory configurations are exemplary, and memory elements may be otherwise configured.

The memory structure 360 can be two-dimensional (2D) or three-dimensional (3D). The memory structure 360 may comprise one or more arrays of memory elements (also referred to as memory cells). A 3D memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major planar surface of the first semiconductor tile 102).

The memory structure 360 on the first tile 102 may be controlled by control logic circuit 350 on the second tile 112. The control logic circuit 350 may have circuitry used for controlling and driving memory elements to accomplish functions such as programming and reading. The control circuitry 350 cooperates with the read/write circuits 368 to perform memory operations on the memory structure 360. In embodiments, control circuitry 350 may include a state machine 352, an on-chip address decoder 354, and a power control module 356. The state machine 352 provides chip-level control of memory operations. A storage region 353 may be provided for operating the memory structure 360 such as programming parameters for different rows or other groups of memory cells. These programming parameters could include bit line voltages and verify voltages.

The on-chip address decoder 354 provides an address interface between that used by the host device or the memory controller (explained below) to the hardware address used by the decoders 364 and 366. The power control module 356 controls the power and voltages supplied to the word lines and bit lines during memory operations. It can include drivers for word line layers in a 3D configuration, source side select gates, drain side select gates and source lines. A source side select gate is a gate transistor at a source-end of a NAND string, and a drain side select gate is a transistor at a drain-end of a NAND string.

A processing core 184 including an integrated processor 174 and CBA memory tile 160 provides several advantages. For example, the large size of the memory tile, matching the size of the processor 174, provides a large non-volatile memory storage for the processor. In examples, this storage capacity may be about 2 terabytes of storage, which is ample storage for even sophisticated processors such as a GPU or AI processor.

As another advantage, the large surface area of CBA memory tile 160 in direct contact with processor 174, and the small pitch electrical connections over this area, allow for a large number of direct electrical connections resulting in high bandwidth data transfer between the CBA memory tile 160 and processor 174. In examples, the high number of direct electrical connections allow for wide-word data transfer between the CBA memory tile 160 and the processor 174, providing for example 1024 bit data transfer between the CBA memory tile and processor 174. This high bandwidth data transfer supports the parallel processing and high performance needs of sophisticated processors such as a GPU or AI processor. Integrating the processor 174 directly atop a large surface area CBA memory tile 160 further provides reduced power requirements and parasitics as compared to conventional processing cores where the non-volatile memory is located remote from the processor.

As another advantage, the TSVs in the passthrough zones allow wide-word data transfer between the processor 174 and the HBM stacks 176, again supporting high bandwidth data transfer between the processor 174 and the HBM stacks 176.

A still further advantage of the present technology is that, given the large size of the CBA memory tile 160, and in particular, the large size of the CMOS logic circuit tile 112, only a small portion of the CMOS logic circuit tile 112 is needed to support the operation of the memory array tile 102. As a result, it is conceivable that certain processing functions of the processor 174 can be offloaded to the CMOS logic circuit tile 112 in addition to the memory management processes normally performed by CMOS logic circuits.

In embodiments described above, the first and second wafers 100, 110 may be diced after formation and bonding of the memory array tiles 102 and CMOS logic circuit tiles 112. The formed CBA memory tile 160 may thereafter be bonded to a processor 174 as described above to form an integrated processing core. In further embodiments, instead dicing one or both wafers 100, 110, the wafers may be used as a whole. For example, the wafers 100, 110 may be formed and bonded together to form a single large CBA memory wafer. Thereafter, multiple processors 174 may be bonded on top of the CBA memory wafer.

In summary, an example of the present technology relates to a processing core, comprising: a signal-carrying medium; a memory tile physically and electrically coupled to the signal carrying medium, the memory tile comprising a first semiconductor tile bonded to a second semiconductor tile; a processor mounted on top of the CBA memory tile, on a side of the CBA memory tile opposite the signal-carrying medium; and one or more semiconductor memory dies mounted to the signal-carrying medium around one or more sides of the CBA memory tile.

In another example, the present technology relates to a processing core, comprising: a signal-carrying medium; one or more semiconductor memory dies mounted to the signal-carrying medium; a CMOS bonded to array (CBA) memory tile physically and electrically coupled to the signal carrying medium, the CBA memory tile comprising: a memory array tile comprising one or more first zones having memory arrays, a CMOS logic circuit tile bonded to the memory array tile, the CMOS logic circuits comprising one or more second zones having CMOS logic circuits, the one or more second zones aligned with the one or more first zones, one or more passthrough zones outside of the one or more first and second zones, the passthrough zones devoid of memory arrays and CMOS logic circuits; and a processor mounted on top of the CBA memory tile, on a side of the CBA memory tile opposite the signal-carrying medium; wherein the CBA memory tile further comprises: a first set of electrical connections in the one or more first and second zones electrically coupling the CBA memory tile to the processor, and a second set of electrical connections in the one or more passthrough zones electrically coupling the one or more semiconductor memory dies with the processor through the CBA memory tile.

In a further example, the present technology relates to a processing core, comprising: a signal-carrying medium; one or more semiconductor memory dies mounted to the signal-carrying medium; a processor mounted to the signal-carrying medium; and non-volatile memory means for providing wide-word memory access to the processor, the non-volatile memory comprising: first means for transmitting electrical signals between the non-volatile memory means and the processor, and second means for transmitting signals between the one or more semiconductor dies and the processor, through the non-volatile memory means.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:
1. A processing core, comprising:
a signal-carrying medium;
a CMOS Bonded Array (CBA) memory tile physically and electrically coupled to the signal carrying medium, the memory tile comprising a first semiconductor tile bonded to a second semiconductor tile;
a processor mounted on the CBA memory tile, on a side of the CBA memory tile opposite the signal-carrying medium; and
one or more semiconductor memory dies mounted on the signal-carrying medium around one or more lateral sides of the CBA memory tile.
2. The processing core of claim 1, wherein the first semiconductor tile comprises a plurality of memory cells.
3. The processing core of claim 2, wherein the second semiconductor tile comprises a CMOS logic circuit for controlling access to the plurality of memory cells.
4. The processing core of claim 3, wherein the processor comprises one or more processing cores.
5. The processing core of claim 3, wherein the first semiconductor tile is bonded to the processor and the second semiconductor tile is coupled to the signal-carrying medium.
6. The processing core of claim 3, wherein the second semiconductor tile is bonded to the processor and the first semiconductor tile is coupled to the signal-carrying medium.
7. The processing core of claim 1, wherein the processor is one of a graphics processing unit and an artificial intelligence processor.
8. The processing core of claim 7, wherein the CBA memory tile is the same length and width as the processor.
9. The processing core of claim 1, further comprising a first set of electrical connections extending between the processor and the CBA memory tile.
10. The processing core of claim 9, further comprising a second set of electrical connections extending between the processor and the one or more semiconductor memory dies through the CBA memory tile.
11. The processing core of claim 1, wherein the one or more semiconductor memory dies comprise one or more stacks of high bandwidth memory.
12. The processing core of claim 1, wherein the one or more semiconductor memory dies comprise one or more stacks of DRAM memory.
13. A processing core, comprising:
a signal-carrying medium;
one or more semiconductor memory dies physically and electrically coupled to the signal-carrying medium;
a CMOS bonded to array (CBA) memory tile physically and electrically coupled to the signal carrying medium, the CBA memory tile comprising:
a memory array tile comprising one or more first zones having memory arrays,
a CMOS logic circuit tile bonded to the memory array tile, the CMOS logic circuit tile comprising one or more second zones having CMOS logic circuits, the one or more second zones aligned with the one or more first zones,
one or more passthrough zones outside of the one or more first and second zones, the passthrough zones devoid of memory arrays and CMOS logic circuits; and a processor mounted on the CBA memory tile, on a side of the CBA memory tile opposite the signal-carrying medium;
wherein the CBA memory tile further comprises:
a first set of electrical connections in the one or more first and second zones electrically coupling the CBA memory tile to the processor, and
a second set of electrical connections in the one or more passthrough zones electrically coupling the one or more semiconductor memory dies with the processor through the CBA memory tile.

14. The processing core of claim 13, wherein the first set of electrical connections provide wide-word data transfer or faster between the CBA memory tile and the processor.

15. The processing core of claim 13, wherein the second set of electrical connections comprise through silicon vias extending through the memory array tile and the CMOS logic circuit tile.

16. The processing core of claim 13, wherein the second set of electrical connections further comprise power and ground signals coupled to the signal carrier medium.

17. The processing core of claim 13, wherein the processor comprises multiple cores configured for parallel processing.

18. The processing core of claim 13, wherein the CBA memory tile has the same footprint as the processor.

19. The processing core of claim 13, wherein the one or more semiconductor memory dies comprise one of high bandwidth memory stacks of semiconductor dies and DRAM stacks of memory dies.

* * * * *